United States Patent
Wagner

[11] Patent Number: 5,878,595
[45] Date of Patent: Mar. 9, 1999

[54] COMPACT PORTABLE ICEMAKER

[76] Inventor: Anthony S. Wagner, 713 Mariner, Lakeway, Tex. 78738

[21] Appl. No.: 9,003

[22] Filed: Jan. 20, 1998

Related U.S. Application Data

[63] Continuation-in-part of Ser. No. 774,630, Dec. 30, 1996, Pat. No. 5,715,691.

[51] Int. Cl.[6] .................................................. F25B 15/10
[52] U.S. Cl. .............................................. 62/490; 62/110
[58] Field of Search ........................... 62/101, 490, 476, 62/110, 491, 492, 457.9, 352

[56] References Cited

U.S. PATENT DOCUMENTS

| | | | |
|---|---|---|---|
| 2,743,588 | 5/1956 | Dreier | 62/492 |
| 3,137,147 | 6/1964 | Boren et al. | 62/490 |
| 4,151,727 | 5/1979 | Blomberg | 62/352 |
| 4,593,538 | 6/1986 | Borde et al. | 62/490 |
| 5,715,691 | 2/1998 | Wagner | 62/110 |

*Primary Examiner*—William Doerrler
*Attorney, Agent, or Firm*—Joseph F. Long

[57] ABSTRACT

A continuously operable portable icemaker charged with an ammonia solution and pressured to about 450 pounds per square inch with hydrogen and powered with a source of heat to cause percolation of the ammonia solution acts to freeze water charged into a removable refillable cylindrical vessel.

4 Claims, 2 Drawing Sheets

COMPACT PORTABLE ICEMAKER

This is a continuation-in-part of Ser. No. 08/774,630 filed Dec. 30, 1996, entitled "Portable Icemaker", now U.S. Pat. No. 5,715,691, issued Feb. 10, 1998.

BACKGROUND OF THE INVENTION

Improvements over the original patent include:

use of higher pressure to minimize exchanger size:

use of aluminum with a corrosion inhibitor to minimize weight;

formation of ice in an easily removable cylindrical shape around a central evaporator tube or freezing component;

simplification of the icemaker components; and in a preferred embodiment arrangement of the icemaker components to make maximum use of the chimney effect to maximize air flow to improve heat transfer.

This patent covers both a free standing unit and a unit made with suitable hooks to allow the unit to be transported and held in the proper upright position by hooking to a side of a normal insulated cooler chest.

The ice is formed from water poured into a container with an inner central cylindrical opening that fits closer than one sixteenth of an inch around the cylindrical evaporator tube or evaporator.

SUMMARY OF THE INVENTION

The invention equipment comprises a percolator, a flash separator, a cooler to cool liquid draining from the flash separator, an ammonia condenser, a cylindrical ammonia evaporator, a cylindrical ice container with a central opening sized to fit closely over the ammonia evaporator, an ammonia absorber, and a receiver that acts as a separator. The invention further comprises necessary interconnecting piping for the units, and a source of heat to cause said percolator to operate after the unit is charged with an ammonia -water solution and pressured to about four hundred and fifty pounds per square inch with hydrogen. Operation of the percolator causes vaporized ammonia to carry the vaporized ammonia and hot water to the top of a standpipe in the flash separator; the ammonia vapor enters and is condensed by air cooling in the ammonia condenser. The condensed ammonia gravity flows into the center tube of the ammonia evaporator; the liquid ammonia exits into the hydrogen filled jacket of the evaporator and vaporizes, taking up heat to cause water to freeze in the ice container. The vaporized ammonia and hydrogen stream are joined by the weak liquid ammonia stream exit the flash cooler at a point exit the evaporator and at the inlet to the ammonia absorber. The vaporized ammonia in the ammonia and hydrogen stream is absorbed in the weak ammonia stream to form a strong ammonia liquid stream that flows into the receiver. In the receiver the hydrogen separates and recycles back into the jacket of the ammonia evaporator. The strong ammonia liquid stream recycles back to the percolator; thus the unit operates continuously as long as heat is supplied to cause percolation.

DESCRIPTION OF THE INVENTION

Figure 1:
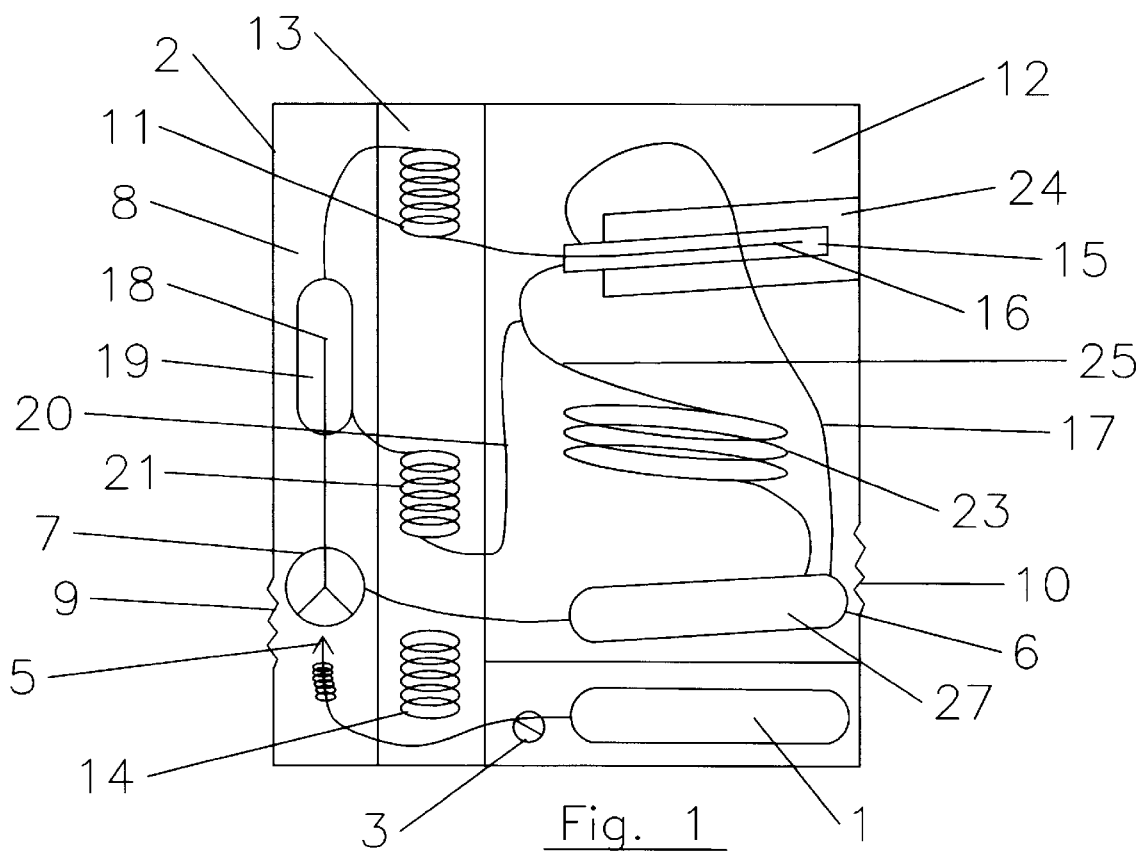
FIG. 1 shows a cut-a-way side view of the major components indicating a preferred arrangement.

The invention may best be described from the drawings. In FIG. 1 an inside view of the components is shown indicating a preferred arrangement to make optimum use of the chimney effect to increase cooling air velocity and thereby increase heat exchange to minimize size of the heat exchangers. With the use of about one percent by weight of glycerin in the ammonia-water-hydrogen charge aluminum is a suitable material of construction and is the preferred material in order to minimize weight of the unit. Other ferrous metals could be used. For operation the unit is charged with approximately the volume of twenty-eight percent aqua ammonia required to fill one half of receiver 27, and all of the volume required to fill percolator 7 and flash separator 19. The unit is then pressured to about 450 pounds per square inch gauge. The burner 5 is then started by opening the needle type control valve to get a very low flame. In about thirty minutes the charging valve 6 is opened to bleed off liquid until only gas is being purged. The unit should be repressured with hydrogen to about four hundred and fifty pounds per square inch. At this point the unit is restarted. Percolator 7 will be carrying vaporized ammonia and liquid through the percolator pipe into flash separator 19. The ammonia vapor will travel overhead to enter condenser coils 11 in the first chimney 13. The liquid ammonia exiting the condenser coils will flow out the inner evaporator tube 16 into the outer jacket 15 that is filled with hydrogen gas returning through line 17 from receiver 27. Helium or argon should be equally suitable to hydrogen for this use. In this atmosphere the ammonia evaporates by taking up heat from the water containing cylinder 29. The water containing cylinder 29 fits within less than one thirty second of an inch around the evaporator outer jacket to facilitate the heat transfer. Weak ammonia liquor flows from the bottom of flash separator 19 to tie into the weak ammonia liquor cooler 21 and through the outlet line 20 to flow into the outlet line from the outer jacket 15 which is the inlet line to absorber coils 23 at point 25 which is just below the elevation of the percolator outlet tube 18. The ammonia vapor and hydrogen are contacting the weak liquor and the ammonia vapor is absorbing in the weak liquor to form a strong ammonia liquor as the fluids pass through the sloping absorber coils 23 to empty into receiver 27. The receiver acts as a strong ammonia liquor-hydrogen separator and hydrogen recycles back to the evaporator outer jacket 15 and the strong ammonia liquor recycles back to the inlet of the percolator 7.

Figure 2:
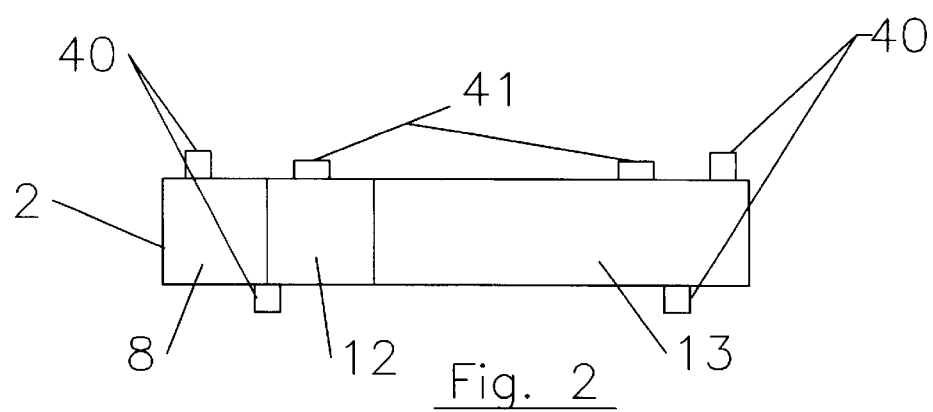
FIG. 2 shows a top view of the unit.

In FIG. 2 a top view of the outer case 2 of the unit is shown. Three compartments in the unit form three chimneys 8, 12, and 13. Opening 9, FIG. 1 allows air to flow into the bottom of the first chimney 8; opening 14 allows air to flow into the bottom of the second chimney 12; and opening 10 allows air to flow into the third chimney 13. A front door of the case 45, FIG. 3, allows access to the unit components and forms the chimneys when closed. Removable extendable legs 40 allow the unit to be used as a free standing ice maker and hooks 41 allow the unit to be hooked to the side of a normal transportable cooler.

Figure 3:
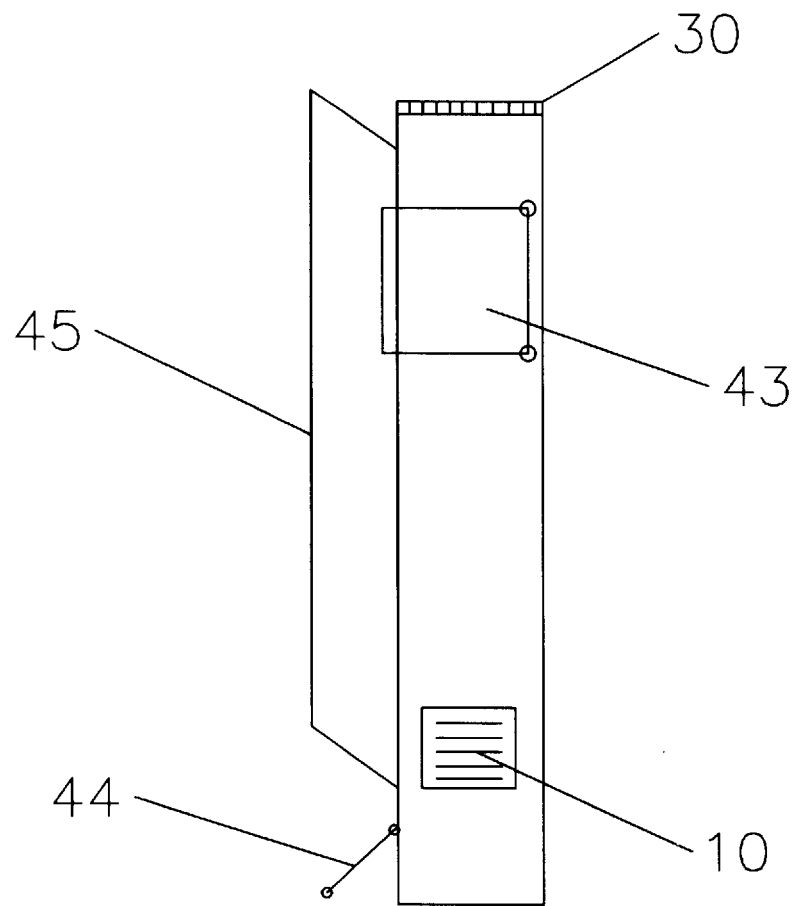
FIG. 3 shows a side view of the unit.

In FIG. 3 a right side view of the unit is shown. Door 44 allows access to install or remove propane bottle 1 or other suitable heat sources to replace burner 5. Other suitable heat sources would include electricity, solar energy and even a candle. Door 45 on the front of the unit allows access to the components of the unit. Door 43 allows installation and removal of ice container 29. Opening 10 allows air to flow into the third chimney 13 and expanded metal cover 30 covers the top of the chimneys 8, 12, and 13.

Figure 4:
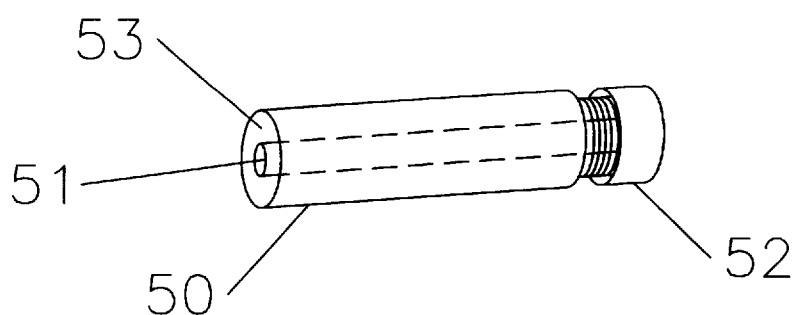
FIG. 4 shows a view of the ice container with a valve that is opened to allow easy ice removal.

In FIG. 4 a view of the ice container 50 is shown. The container 50 has a water tight screw cap 52 and a central opening 51 sized to fit closer than one thirty second of an inch around the evaporator outer jacket 15, FIG. 1. The container 50 is not filled completely full to allow for expansion as the water freezes into ice. Valve 53 may be opened to allow for easier removal of the ice from container 50 by preventing formation of a vacuum as the ice cylinder slides out of the container. Although a plastic or stainless steel could be used the preferred material of construction for the ice container is aluminum.

What is claimed is:

1. A portable icemaker comprising:
  a) a rectangular case greater than two inches in depth; said case having removable extendable legs to form a free standing unit and having hooks to mount said case with said legs removed;
  b) a first vertical compartment, a second vertical compartment, and a third vertical compartment with a covered opening in a bottom portion of each of said vertical compartments to allow free admission of air in said compartments.
  c) a percolator unit, a flash separator, and a means to heat said percolator in said first compartment;
  d) an ammonia condenser coil in a top part of said second compartment with an inlet line leading from a top of said flash separator;
  e) a weak liquor cooling coil in a lower part of said second compartment with an inlet line leading from a bottom of said flash separator;
  f) a cylindrical evaporator mounted in said third compartment in an essentially horizontal but sloped position, said cylindrical evaporator having a central inner tube and an outer jacket with said central inner tube opening into said outer jacket; said central inner tube being connected on the inlet end with an exit line from said ammonia condenser coil;
  g) a cylindrical ice container with a screw cap to allow filling with water and a central opening to allow said ice container to fit closely over said cylindrical evaporator;
  h) an absorber coil mounted in said third compartment with an inlet end of said absorber coil leading from a lower end of said outer jacket of said evaporator and connecting with an outlet end of said weak liquor cooling coil ;
  i) A hydrogen recycle line, a liquid recycle line , a charging valve and a receiver; said receiver being almost horizontally mounted but sloped with an inlet end of said liquid recycle line connecting to said receiver at a low point at a lower end of said receiver and an exit end of said liquid recycle line connecting to said percolator unit; an inlet end of said hydrogen recycle line connecting into a top portion of said receiver and an outlet end of said hydrogen recycle line connecting into said outer jacket of said evaporator; said charging valve connected into said receiver at a low point of said upper end of said receiver;
  j) an initial operating charge in said ice maker comprising: hydrogen to pressure all of said components of said ice maker to about 450 pounds per square inch gauge, sufficient quantity of an approximately 28% ammonia-water solution to fill said percolator unit and said flash separator and to fill to one half full said receiver;
  an amount of glycerin equal to approximately one percent of the weight of said approximately 28% ammonia-water solution;
  k) a final charge comprising said hydrogen and an amount of said initial charge of said 28% ammonia-water and said glycerin remaining after activating said percolator heating means and after bleeding off liquid remaining above said charge valve after operation of said percolator heating means for approximately thirty minutes; operation of said percolator heating means causes ammonia to separate in said flash separator, to condense in said ammonia condenser and to feed into and evaporate in said hydrogen in said outer jacket of said evaporator, thereby starting to freeze water in said ice container; said ammonia then joining with a weak ammonia solution exiting said weak ammonia liquor cooler and being absorbed in said weak ammonia solution in said ammonia absorber to form a strong ammonia liquor with said strong ammonia liquor and said hydrogen associated therewith exiting said ammonia absorber into said receiver; said hydrogen then recycling back to said outer jacket of said evaporator and said strong ammonia liquor recycling back to said percolator.

2. A method for making ice in a portable icemaker comprising:
  a) feeding a charge in said icemaker comprising: hydrogen to pressure all of said components of said ice maker to about 450 pounds per square inch gauge, sufficient quantity of an approximately 28% ammonia-water solution to fill a percolator unit and a flash separator and to fill to one half full a receiver;
  b) filling a cylindrical ice container having a cylindrical opening with water;
  c) inserting said ice container over a cylindrical double walled ammonia evaporator;
  d) activating a percolator heating means to cause ammonia to separate in said flash separator, to condense in an ammonia condenser and to feed into and evaporate in hydrogen in an outer jacket of said evaporator, thereby starting to freeze water in said ice container; said ammonia from said evaporator then joining with a weak ammonia solution exiting a weak ammonia liquor cooler and being absorbed in said weak ammonia solution in an ammonia absorber to form a strong ammonia liquor with said strong ammonia liquor and said hydrogen associated therewith exiting said ammonia absorber into said receiver; said hydrogen then recycling back to said outer jacket of said evaporator and said strong ammonia liquor recycling back to said percolator to allow continuous operation.

3. A portable icemaker comprising:
  a) a body,
  c) a percolator unit, a flash separator, and a means to heat said percolator in with said flash separator fastened in said body above said percolator;
  d) an ammonia condenser coil fastened in said body and having an inlet line leading from a top of said flash separator;
  e) a weak liquor cooling coil with an inlet line leading from a bottom of said flash separator;
  f) a cylindrical evaporator mounted in an essentially horizontal but sloped position, said cylindrical evaporator having a central inner tube and an outer jacket with said central inner tube opening into said outer jacket; said central inner tube being connected on the inlet end with an exit line from said ammonia condenser coil;

g) a cylindrical ice container with a screw cap to allow filling with water and a central cylindrical opening to allow said ice container to fit closely over said cylindrical evaporator;

h) an ammonia absorber coil with an inlet end of said absorber coil leading from a lower end of said outer jacket of said evaporator and connecting with an outlet end of said weak liquor cooling coil ;

i) A hydrogen recycle line, a strong ammonia liquid recycle line , a charging valve and a receiver; said receiver being almost horizontally mounted but sloped with an inlet end of said liquid recycle line connecting to said receiver at a low point at a lower end of said receiver and an exit end of said liquid recycle line connecting to said percolator unit; an inlet end of said hydrogen recycle line connecting into a top portion of said receiver and an outlet end of said hydrogen recycle line connecting into said outer jacket of said evaporator; said charging valve connected into said receiver at a low point of said upper end of said receiver;

j) an operating charge in said ice maker comprising:
hydrogen to pressure all of said components of said ice maker to about 450 pounds per square inch gauge, sufficient quantity of an approximately 28% ammonia-water solution to fill said percolator unit and said flash separator and to fill to one half full said receiver;

k) a heating means to activate said percolator; activation of said percolator heating means causes ammonia to separate in said flash separator, to condense in said ammonia condenser and to feed into and evaporate in said hydrogen in said outer jacket of said evaporator, thereby starting to freeze water in said ice container; said ammonia then joining with a weak ammonia solution exiting said weak ammonia liquor cooler and being absorbed in said weak ammonia solution in said ammonia absorber to form a strong ammonia liquor with said strong ammonia liquor and said hydrogen associated therewith exiting said ammonia absorber into said receiver; said hydrogen then recycling back to said outer jacket of said evaporator and said strong ammonia liquor recycling back to said percolator thus causing continuous operation of said icemaker as long as sufficient heat is applied to said percolator.

4. A compact portable icemaker as in claim 3 wherein about one percent by weight of glycerin is added to said operating charge.

* * * * *